US011485919B2

(12) United States Patent
Zhou et al.

(10) Patent No.: US 11,485,919 B2
(45) Date of Patent: *Nov. 1, 2022

(54) APPARATUS AND METHOD FOR GENERATING ELECTRICITY AND PRODUCING CARBON AND HEAT VIA BIOMASS FIXED BED GASIFICATION

(71) Applicant: NANJING FORESTRY UNIVERSITY, Nanjing (CN)

(72) Inventors: Jianbin Zhou, Nanjing (CN); Yimeng Zhang, Nanjing (CN); Huanhuan Ma, Nanjing (CN)

(*) Notice: Subject to any disclaimer, the term of this patent is extended or adjusted under 35 U.S.C. 154(b) by 218 days.

This patent is subject to a terminal disclaimer.

(21) Appl. No.: 16/484,075

(22) PCT Filed: Aug. 28, 2018

(86) PCT No.: PCT/CN2018/102795
§ 371 (c)(1),
(2) Date: May 31, 2020

(87) PCT Pub. No.: WO2019/011347
PCT Pub. Date: Jan. 17, 2019

(65) Prior Publication Data
US 2020/0308990 A1 Oct. 1, 2020

(30) Foreign Application Priority Data
Jul. 14, 2017 (CN) .................... C201710576970.X

(51) Int. Cl.
C10J 3/86 (2006.01)
C10J 3/72 (2006.01)
(Continued)

(52) U.S. Cl.
CPC . C10J 3/20 (2013.01); C10J 3/86 (2013.01); F23G 5/027 (2013.01);
(Continued)

(58) Field of Classification Search
CPC ...... F23B 90/06; F23G 2201/40; Y02E 20/12; C10J 2300/0916; C10J 2300/0956;
(Continued)

(56) References Cited

U.S. PATENT DOCUMENTS 3,787,193 A * 1/1974 Seglin .................. C10J 3/57
48/210
2003/0106266 A1 * 6/2003 Bryan .................. C10J 3/54
48/77

(Continued)

FOREIGN PATENT DOCUMENTS

CN 105368496 3/2016
CN 105368499 3/2016
(Continued)

Primary Examiner — Imran Akram
(74) Attorney, Agent, or Firm — Rumit Ranjit Kanakia

(57) ABSTRACT

A method and apparatus for generating electricity and producing carbon and heat via biomass fixed bed gasification, said method and apparatus utilising medium calorific value combustible gas to satisfy high-temperature high-pressure boiler heat requirements, and increasing overall electricity generation efficiency. The method and apparatus have low nitrogen oxides amounts, satisfy environmental protection requirements, and do not require denitrification treatment. The method comprises the following steps: feeding a biomass raw material into a gasification apparatus to prepare a medium calorific value biomass combustible gas, and performing gasification on the biomass raw material at 700-850° C. under the effect of an air/water vapour pre-mixed gasification agent to produce a combustible gas, the calorific value of the combustible gas being 1600-1800 kcal, the temperature being 200-300° C.; directly feeding the combustible gas into an environmentally friendly combustion chamber for combustion, and then into a high-temperature high-pressure boiler, the gas combusting within the high-temperature high-pressure boiler to produce high-tempera- (Continued)

ture high-pressure steam, which drives a steam turbine to generate electricity; utilising steam waste heat discharged by the steam turbine; using boiler tail gas to heat air by means of an air preheater, the hot air being respectively fed into the combustion chamber and the gasification apparatus by means of an air blower, and utilising the waste heat.

5 Claims, 8 Drawing Sheets

(51) Int. Cl.
    *C10J 3/20* (2006.01)
    *F23G 5/027* (2006.01)
    *F01K 23/06* (2006.01)

(52) U.S. Cl.
    CPC .......... *C10J 2300/0916* (2013.01); *C10J 2300/0956* (2013.01); *C10J 2300/0976* (2013.01); *C10J 2300/1606* (2013.01); *C10J 2300/1675* (2013.01)

(58) Field of Classification Search
    CPC ........ C10J 2300/1606; C10J 2300/1675; C10J 3/20; C10J 3/72; C10J 3/86; F01K 23/067
    See application file for complete search history.

(56) References Cited

U.S. PATENT DOCUMENTS

| | | | |
|---|---|---|---|
| 2008/0141672 A1* | 6/2008 | Shah | C10J 3/466 |
| | | | 423/220 |
| 2011/0315096 A1* | 12/2011 | Wilson | F01K 23/067 |
| | | | 123/3 |
| 2014/0175803 A1 | 6/2014 | DePuy et al. | |
| 2015/0247636 A1* | 9/2015 | Einarsson | F23G 5/442 |
| | | | 110/208 |

FOREIGN PATENT DOCUMENTS

| | | |
|---|---|---|
| CN | 105505466 | 4/2016 |
| CN | 105505469 | 4/2016 |
| CN | 205473608 | 8/2016 |
| CN | 205874319 | 1/2017 |
| CN | 107177381 | 9/2017 |

\* cited by examiner

APPARATUS AND METHOD FOR GENERATING ELECTRICITY AND PRODUCING CARBON AND HEAT VIA BIOMASS FIXED BED GASIFICATION

FIELD OF THE INVENTION

The invention relates to a method and apparatus for generating electricity and producing carbon and heat via biomass fixed bed gasification, belonging to the field of biomass energy.

BACKGROUND OF THE INVENTION

Under the dual pressures of energy and environment, vigorously developing clean renewable energy has become a very urgent global issue facing governments around the world. Comparing with other new energy sources, biomass energy has the characteristics of being renewable, less polluting, and transportable and storage, and most compatible with the current energy industry, therefore, it is particularly concerned. China is a large agricultural country with abundant resources, large quantities and diverse varieties of agricultural and forestry resources. In the context of favorable policies, the utilization of biomass resources has achieved considerable development in China, but at the same time it has produced many problems in technology and equipment.

As a method of thermo chemical conversion in the utilization of biomass resources, biomass gasification has been studied in many universities in China. People have successively developed many gasification power generation processes and equipment.

Throughout the current biomass resource utilization gasification power generation process and equipment, there are the following problems: single product, low economic efficiency; the use of wet purification system causes water pollution; due to incomplete purification, the stability of the internal combustion engine and gas turbine power generation system is poor. The Nanjing Forestry University team proposed a multi-generation process for biomass gasification hot gas-fired boiler to drive steam turbine power generation. It has achieved staged success, but it also encountered two major problems:

1) For biomass gasification gas combustion, although the exhaust gas produces low levels of nitrogen oxide content, due to the increasing environmental requirements, it is bound to require exhaust gas gentrification treatment which is expensive, and small-scale industrial projects are not suitable for use;

2) The calorific value of combustible gas produced by biomass gasification is low, and it is not suitable for use in high-temperature high-pressure boiler, which affects the overall efficiency of power generation. Therefore, it is necessary to propose a new process to solve the problem of calorific value and combustible gas environmentally friendly combustion.

SUMMARY OF THE INVENTION

The present invention provides a method for generating electricity and producing carbon and heat via biomass fixed bed gasification, the purpose of which is to solve the above defects existing in the prior art, and generate a medium calorific value combustible gas, which satisfies the high-temperature high-pressure boiler heat requirements, and increasing overall electricity generation efficiency; after adopting the method, the nitrogen oxide content is low, satisfy environmental protection requirements, and do not require gentrification treatment.

A method for generating electricity and producing carbon and heat via biomass fixed bed gasification according to the present invention comprises the following steps:

1) Feeding a biomass raw material into a gasification apparatus to prepare a medium calorific value biomass combustible gas, and performing gasification on the biomass raw material at 700-850° C. under the effect of an air/water vapor pre-mixed gasification agent to produce a combustible gas, the calorific value of the combustible gas being 1600-1800 kcal, the temperature being 200-300° C.;

2) Directly feeding the combustible gas into an environmentally friendly combustion chamber for combustion, and then into a high-temperature high-pressure boiler, the gas combusting within the high-temperature high-pressure boiler to produce high-temperature high-pressure steam, which drives a steam turbine to generate electricity; utilizing steam remaining heat discharged by the steam turbine;

3) Collecting carbon discharged from the gasification apparatus after cooling; and 4) Using boiler exhaust gas to heat air by means of an air preheater, the hot air being respectively fed into the combustion chamber and the gasification apparatus by means of an air blower, and utilizing the remaining heat.

The above-mentioned method for generating electricity and producing carbon and heat via biomass fixed bed gasification, wherein the low temperature water generated by the steam turbine is used for replenish to the boiler after heat exchanged with the boiler exhaust gas in the economizer 500.

The present invention also provides an apparatus for generating electricity and producing carbon and heat via biomass fixed bed gasification which can generate a medium calorific value combustible gas, satisfy the high-temperature high-pressure boiler heat requirements, and increasing overall electricity generation efficiency, and do not require gentrification treatment.

An apparatus for generating electricity and producing carbon and heat via biomass fixed bed gasification according to the present invention comprises a gasification apparatus 200 for preparing a medium calorific value biomass combustible gas, a stable and environmentally friendly combustion chamber for stable combustion for biomass gasification combustible gas 300, a high-temperature high-pressure boiler 400, an air preheater 600, a flue gas exhaust fan 700, a steam turbine 900, and a generator; the combustible gas outlet in the gasification apparatus 200 communicates with the combustion pipe in the environmentally friendly combustion chamber 300, and the outlet high-temperature flue gas pipe in the environmentally friendly combustion chamber 300 communicates with the gas inlet in the high-temperature high-pressure boiler 400; the steam outlet in the high-temperature high-pressure boiler 400 communicates with the steam inlet in the steam turbine 900; the exhaust pipe of the high temperature high-pressure boiler 400 communicates with the shell path of the air preheater 600, after the air preheating pipe passes through the pipe path of the air preheater 600, it is respectively communicated with the combustion pipe and the gasification apparatus.

The above-mentioned apparatus for generating electricity and producing carbon and heat via biomass fixed bed gasification, wherein the low temperature water outlet in the steam turbine 900 through the coal economizer 500 communicates with the filling port of 400 in the high-temperature high-pressure boiler; the exhaust pipe in the high-temperature high-pressure boiler 400 is in turn communicates with the coal economizer 500 and the air preheater 600.

The above-mentioned apparatus for generating electricity and producing carbon and heat via biomass fixed bed gasification, wherein the gasification apparatus 200 for preparing a medium calorific value biomass combustible gas comprises a gasifier and a steam generating air intake system; a closed feed device 2 is arranged in the upper portion of the gasifier, a spiral discharge air distribution device 5 is arranged at the bottom of the gasifier, and a screw shaft 29 rotating in the spiral discharge air distribution device 5 is a hollow shaft having a spiral blade on the outer circumference, and an air outlet for communicating the inside of the hollow shaft with the inside of the gasifier is uniformly disposed on the hollow shaft; the steam generating air intake system includes a skirt drum 11, a circulating heat pump 12, and a heating tube sheet 4 disposed at the gasifier, a mixer 13, a fan 17 and a valve; the outlet of the heating tube sheet 4 is connected to the water intake of the steam drum 9 through the circulating heat pump 12; the steam outlet 7 of the steam drum is connected to the inlet of the mixer 13 via the valve 15; the outlet of the fan 17 is connected to the inlet of the mixer 13 via the valve 14; the outlet of the mixer 13 is connected to the end of the screw shaft 29 through the rotary joint 30; the inlet of the fan 17 is connected to the air outlet of the air preheater 600.

The above-mentioned apparatus for generating electricity and producing carbon and heat via biomass fixed bed gasification, wherein the spiral discharge air distribution device 5 comprises a plurality of parallel trapezoidal carbon trough 28 passing through the bottom of the gasifier, each trapezoidal carbon trough 28 is provided with a rotating screw shaft 29; the end of each trapezoidal carbon trough 28 extending outside the gasifier is connected to a carbon warehouse 26; a rotating secondary carbon spiral 27 is placed in the carbon warehouse 26.

The above-mentioned apparatus for generating electricity and producing carbon and heat via biomass fixed bed gasification, wherein the environmentally friendly combustion chamber 300 is divided into a first stage cavity and a second stage cavity body 48 through a honeycomb shaped heat storage body 46; a combustion pipe 41 is connected to a biomass gas inlet and a primary air distribution pipe 54 the combustion pipe 41 is connected to the first stage cavity body 45, and an ignition gun 42 and a thermocouple T1 are arranged on the first stage cavity body 45, a secondary air distribution pipe 47, opposite to the honeycomb-shaped heat storage body 46, and a thermocouple T2 are arranged within the second stage cavity body 48 and the second stage cavity body 48 is connected to the outlet high-temperature flue gas pipe 51, the primary air distribution pipe 54, a primary air volume adjustment valve 52, the secondary air distribution pipe 47 and a secondary air volume adjustment valve 53 are connected to a air supply fan 49, and a controller 50 is connected to the thermocouple T1, the thermocouple T2, the primary air volume adjustment valve 52, the secondary air volume adjustment valve 53, and the air supply fan 49, the inlet of the blower 49 is connected to the air outlet of the air preheater 600.

The above-mentioned apparatus for generating electricity and producing carbon and heat via biomass fixed bed gasification, wherein the distance between the honeycomb-shaped heat storage body 46 and the end of the inlet combustion pipe 41 is 1.1-1.3 times of the length of the combustion flame, the heat storage body is coaxial with the combustion pipe, the middle portion of the heat storage body has a non-opening area that is as large as the cross-sectional area of the combustion pipe, the peripheral portion of the heat storage body is opened a through hole, the flow area of the through hole is 40-50% of the cross-sectional area of the peripheral portion of the heat storage body, the material of the heat storage body is zirconium corundum brick or magnesia chrome brick.

The above-mentioned apparatus for generating electricity and producing carbon and heat via biomass fixed bed gasification, wherein the primary air volume entering the combustion pipe through the primary air distribution pipe (54) is about 90% of the required air volume of the combustible gas; the secondary air volume entering the second stage cavity body through the secondary air distribution pipe is 10% of the required air volume of the combustible gas; the temperature of the first stage cavity body is below 1000° C.

The present invention has the following beneficial effects: the present invention collects and shaves the biomass raw material to 3-5 cm, and then is sent into the gasification apparatus using a medium calorific value biomass combustible gas under the action of the leather conveyor or hoister. The hot gas produced by the gasification is sent into the high-temperature high-pressure boiler after being burned through the stable and environmentally friendly combustion chamber, the gas is burned in the high-temperature high-pressure boiler to generate high-temperature high-pressure steam, so that drive the steam turbine to generate electricity, and the steam turbine exhausts the remaining heat of the steam for heating, and after cooling and collecting the carbon discharged from the bottom of the gasification apparatus, according to different biomass materials, it can be used to make barbecue carbon, carbon-based fertilizer, activated carbon and the like.

The boiler exhaust gas is heated by the air preheater, and the hot air is sent into the combustion chamber and the gasification apparatus by the drum fan, and the remaining heat is utilized.

No external heat is required to increase the calorific value of the combustible gas, satisfying the heat demand of the high-temperature high-pressure boiler, and improving the power generation efficiency.

Using the environmentally friendly combustion chamber to ensure complete combustion under the fluctuation of the calorific value of the gas, stable operation and reduce the nitrogen oxide content generation, which is more environmentally friendly.

Diversifying the product and fully utilizing the exhaust gas preheating.

Reference number in drawings are as follows:

100 is a biomass pretreatment device, 200 is a gasification apparatus for preparing a medium calorific value biomass combustible gas, 300 is a stable and environmentally friendly combustion chamber for biomass gasification combustible gas, 400 is a high-temperature high-pressure boiler, 500 is a coal economizer, 600 is an air preheater, 700 is a flue gas exhaust fan, 800 is an exhaust, 900 is a steam turbine, and 1000 is a generator.

1 is a reducer-driven rotating spreader, 2 is a closed feed device, 3 is a combustible gas outlet, 4 is a heating tube sheet, 5 is a spiral discharge air distribution device, 6 is a bridge breaking device, 7 is a steam outlet, 8 is a filling port, 9 is a water inlet, 10 is a water outlet, 11 is a spark drum, 12 is a circulating heat pump, 13 is a mixer, 14 is a first valve, 15 is a second valve, 16 is a third valve, 17 is a fan.

18 is a hopper, 19 is a first knife valve, 20 is a feeding device level gauge, 21 is an intermediate transition silo, 22 is a second knife valve, and 23 is a feeding spiral.

24 is a carbon spiral blade within boiler, 25 is a reducer, 26 is a carbon warehouse, 27 is a secondary carbon spiral, 28 is a trapezoidal carbon trough, 29 is a screw shaft, 30 is rotary joint, 31 is mixed gasification agent inlet, 32 is a level gauge.

41 is a combustion pipe, 42 is an igniter, 43 is a fire door, 45 is a first stage cavity body, 46 is a heat storage body, 461 is an intermediate portion of the heat storage body, and 462 is a peripheral portion of the heat storage body (open area), 463 is through hole; 47 is a secondary air distribution pipe, 471 is a secondary air distribution pipe air outlet, 48 is a second stage cavity body, 49 is a blower, 50 is a controller, 51 is an outlet high-temperature flue gas pipe, 52 is a primary air volume adjustment valve, 53 is a secondary air volume adjustment valve, 54 is a primary air distribution pipe.

DETAILED DESCRIPTION

Figure 1:
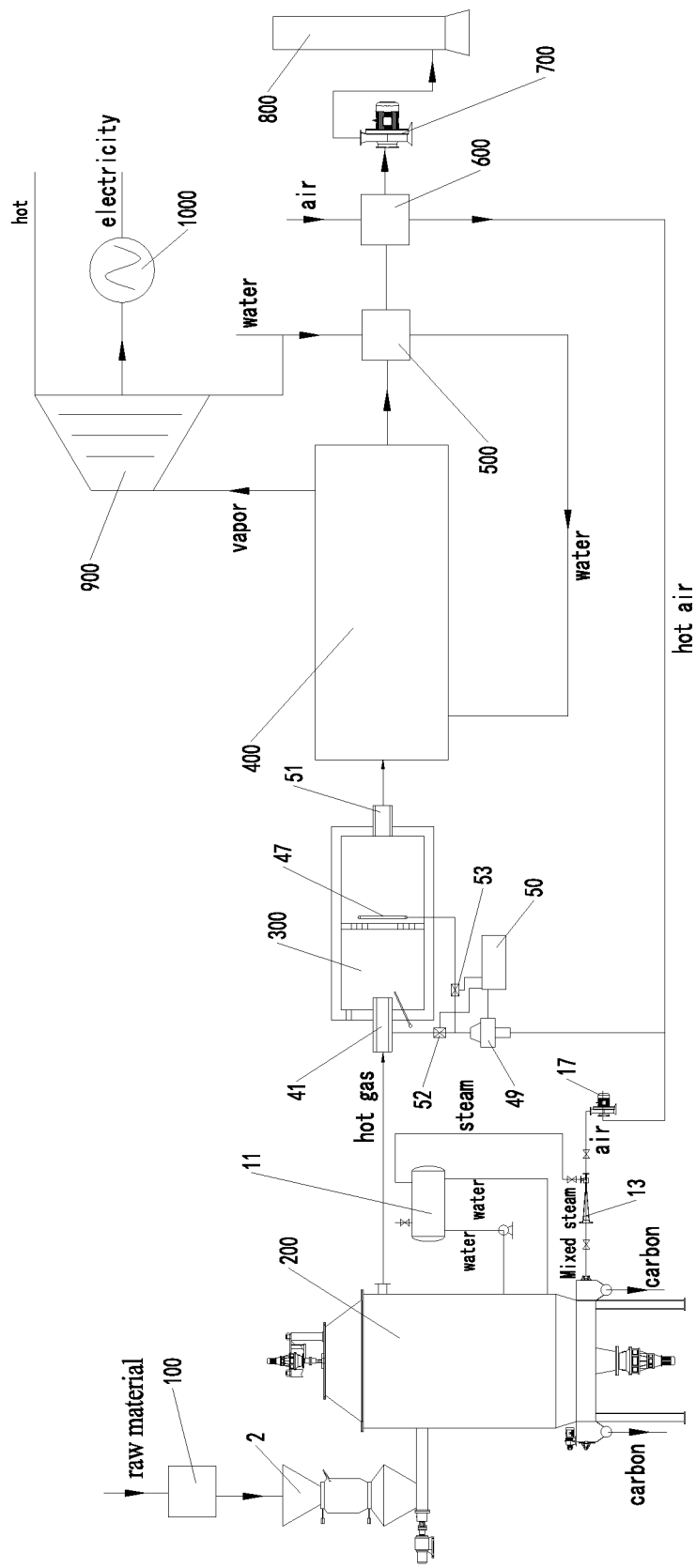
FIG. 1 is a flow chart of generating electricity and producing carbon and heat via biomass fixed bed gasification.

Referring to the apparatus for generating electricity and producing carbon and heat via biomass fixed bed gasification shown in FIG. 1, the combustible gas outlet in the gasification apparatus 200 communicates with the combustion pipe in the environmentally friendly combustion chamber 300, and the outlet high-temperature flue gas pipe in the environmentally friendly combustion chamber 300 communicates with the gas inlet in the high-temperature high-pressure boiler 400; the steam outlet in the high-temperature high-pressure boiler 400 communicates with the steam inlet in the steam turbine 900; the exhaust pipe in the high-temperature high-pressure boiler 400 is in turn communicates with the shell path of the coal economizer 500 and the air preheater 600. After the air preheating pipe passes through the pipe path of the air preheater 600, it is respectively connected to the inlet of the fan 17 in the gasification apparatus 200 and the inlet of the blower 49 in the environmentally friendly combustion chamber 300, so that the hot air is sent into the combustion pipe and the gasification apparatus. The low temperature water outlet in the steam turbine 900 through the coal economizer 500 communicates with the filling port of the high-temperature high-pressure boiler 400. The steam turbine 900 drives the generator 1000 to generate electricity.

Figure 2:
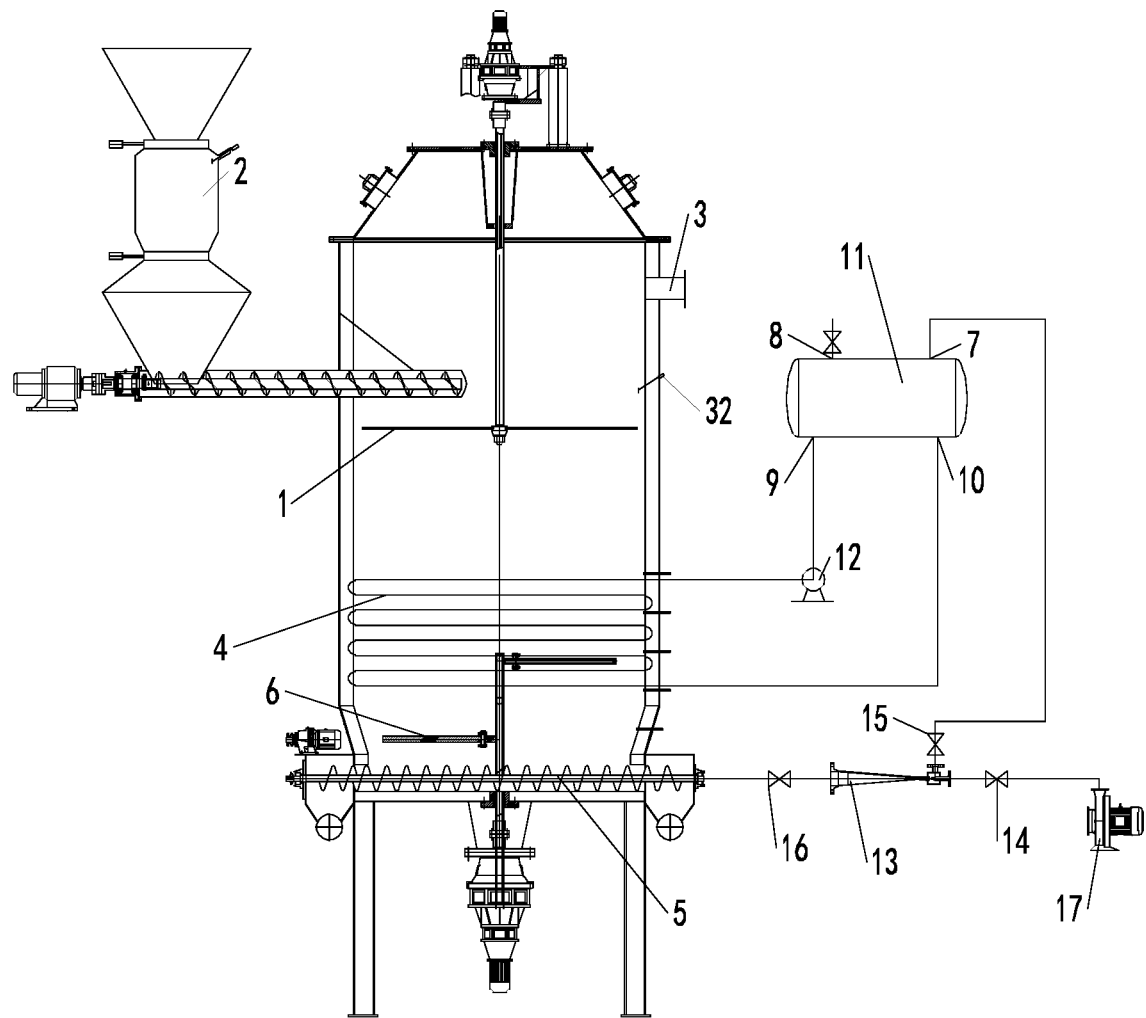
FIG. 2 is the gasification apparatus for preparing medium calorific value biomass combustible gas.

Referring to the gasification apparatus for preparing a medium calorific value biomass combustible gas shown in FIG. 2, the upper portion of the gasifier is provided with a reducer-driven rotating spreader 1 for flattening the gasification raw material from the closed feed device 2, and the closed feed device 2 according to the level gauge 32 disposed on the gasifier body controls the feeding thereof, and the heating tube sheet 4 is disposed on the boiler wall 300 mm above the spiral discharge air distribution device 5, and a bridge breaking device 6 is disposed at the lower portion of the boiler body to prevent bridging of the reaction layer.

The steam generating air intake system is composed of a steam drum 11, a circulating heat pump 12, a mixer 13, a valve, a fan 17, and the like. The steam drum 11 is provided with a filling port 8, a water inlet 9, a water outlet 10, and a water vapor outlet 7. The outlet of the heating tube sheet 4 is connected to the steam drum water inlet 9 through a circulating heat pump 12, the water vapor outlet 7 of the steam drum 11 is connected to the mixer 13 through the second valve 15, the outlet of the fan 17 providing the gasifying agent is connected to the mixer 13 through the first valve 14 and the outlet of the mixer 13 is connected to the screw shaft 29 through the rotary joint 30, and the mixer 13 realizes the mixing of the air with the water vapor generated by the heat in the reaction zone of the gasifier, and uniformly passes them into the reaction zone through the screw shaft 29.

Figure 3:
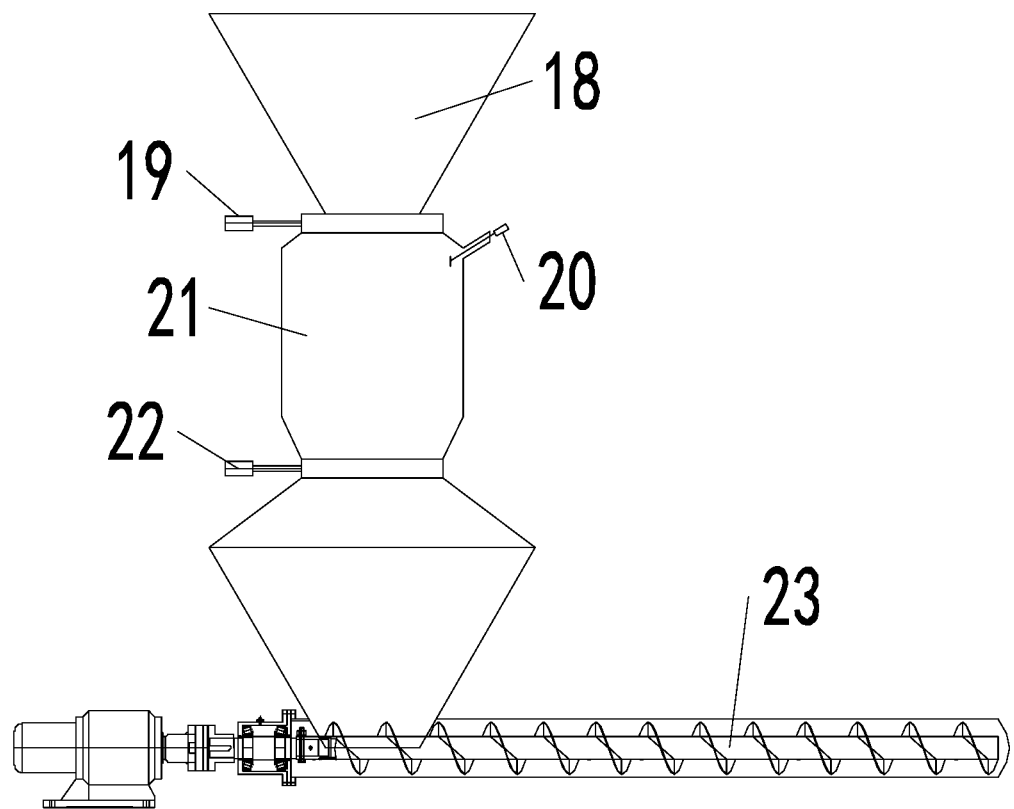
FIG. 3 is a schematic diagram of the closed feed device.

According the closed feed device shown in FIG. 3, including a hopper 18, a intermediate transition silo 21, a bottom silo, a feeding spiral 23, and so on. The first knife valve 19 is disposed between the hopper 18 and the intermediate transition silo 21, and the second knife valve 22 is disposed between the intermediate transition silo 21 and the bottom silo, and the lower portion of the bottom silo is arranged extending into the feeding spiral 23 within the gasifier. The raw material first enters the hopper 18, and then opens the first knife valve 19, the raw material enters the intermediate transition silo 21, closes the first knife valve 19, opens the second knife valve 22, and the raw material enters the bottom silo. Then turn on the feeding spiral 23 and the raw material enters the gasifier while the second knife valve 22 is closed, thereby achieving the closed feed.

Figure 4:
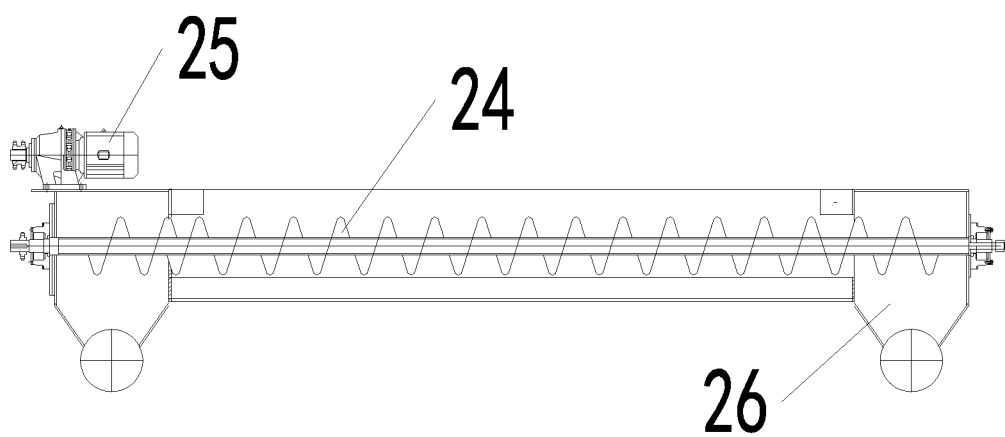
FIG. 4 is a front view of the spiral discharge air distribution device.
Figure 5:
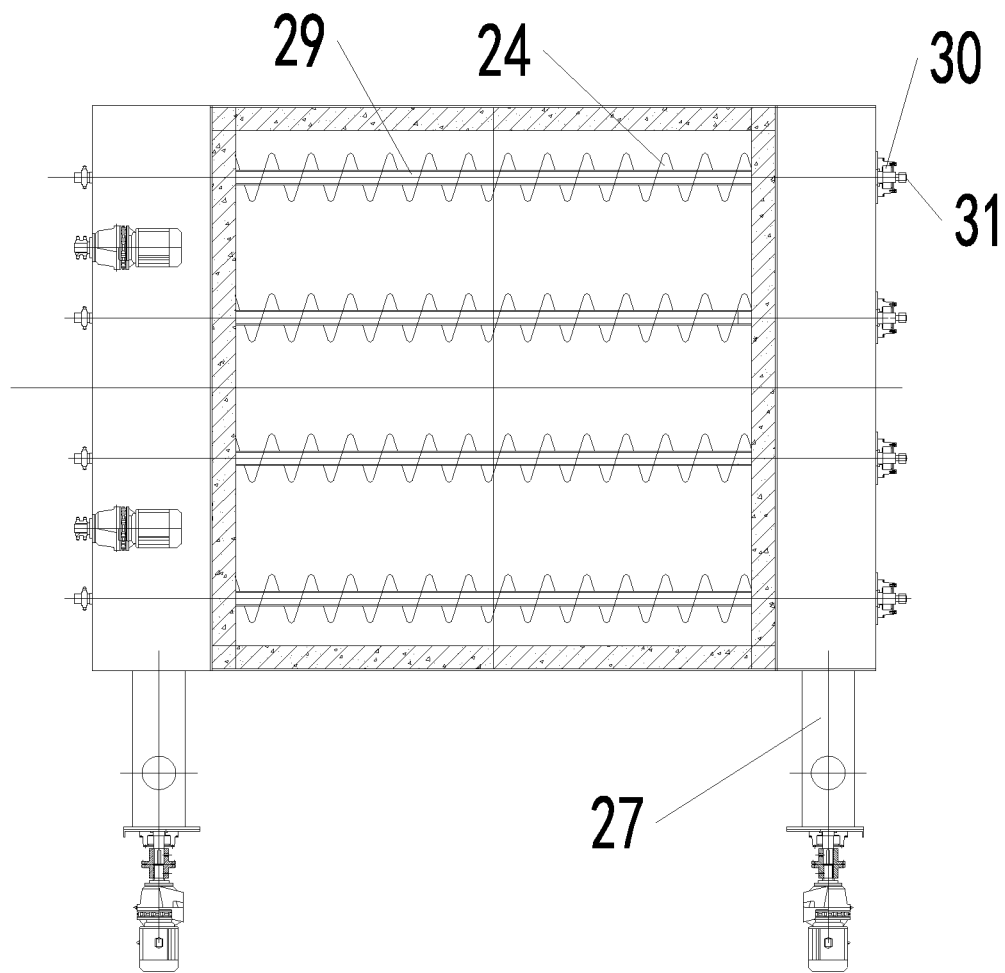
FIG. 5 is a top view of the spiral discharge air distribution device.
Figure 6:
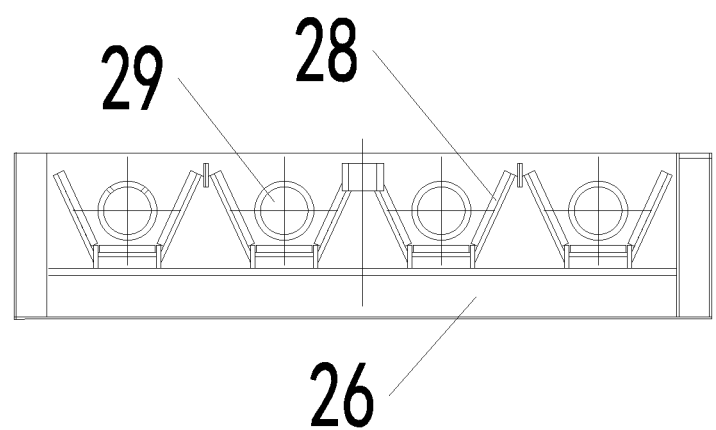
FIG. 6 is a side view of the spiral discharge air distribution device.

The spiral discharge air distribution device 5 is used to achieve uniform gas distribution in addition to carbon. Referring to the schematic diagram of the spiral discharge air distribution device shown in FIGS. 4-6, it consists of a carbon spiral blade within boiler 24, a reducer 25, a carbon warehouse 26, a secondary carbon spiral 27, a trapezoidal carbon trough 28, and a rotary joint 30. The reducer 25 drives the screw shaft 29 with the carbon spiral blade within boiler 24 to rotate the carbon, the carbon warehouse 26 is connected to the two ends of the trapezoidal carbon trough 28, and the carbon warehouse 26 is connected to the secondary carbon spiral 27. On the screw shaft tube 29 of the carbon spiral blade within boiler 24, an air outlet for the air distribution is evenly distributed for uniformly distributing the gasifying agent into the boiler.

The advantages of the gasification apparatus for preparing a medium calorific value biomass combustible gas are that the valve is connected to the mixer, and the outlet of the fan providing the gasifying agent is connected to the valve and the mixer, and the mixer outlet is connected to the intermediate shaft of the discharging screw, so that realizes the mixing of the air with the water vapor generated by the heat in the reaction zone of the gasifier, and uniformly passes them into the reaction.

In the spiral discharge air distribution device, the screw shaft, which is a hollow shaft, uniformly arranges the air outlets, realizes a dual-purpose machine, uniformly distributes the air while uniformly discharging, and preheats the gasifying agent.

It is simple and convenient to arrange the tube sheet in the reaction zone and use the heat of the reaction zone to obtain water vapor.

The pre-mixing system of air and water vapor outside the boiler ensures that the water vapor reaction can provide sufficient heat without causing a drop in the reaction temperature and ensure stable gasification.

Figure 7:
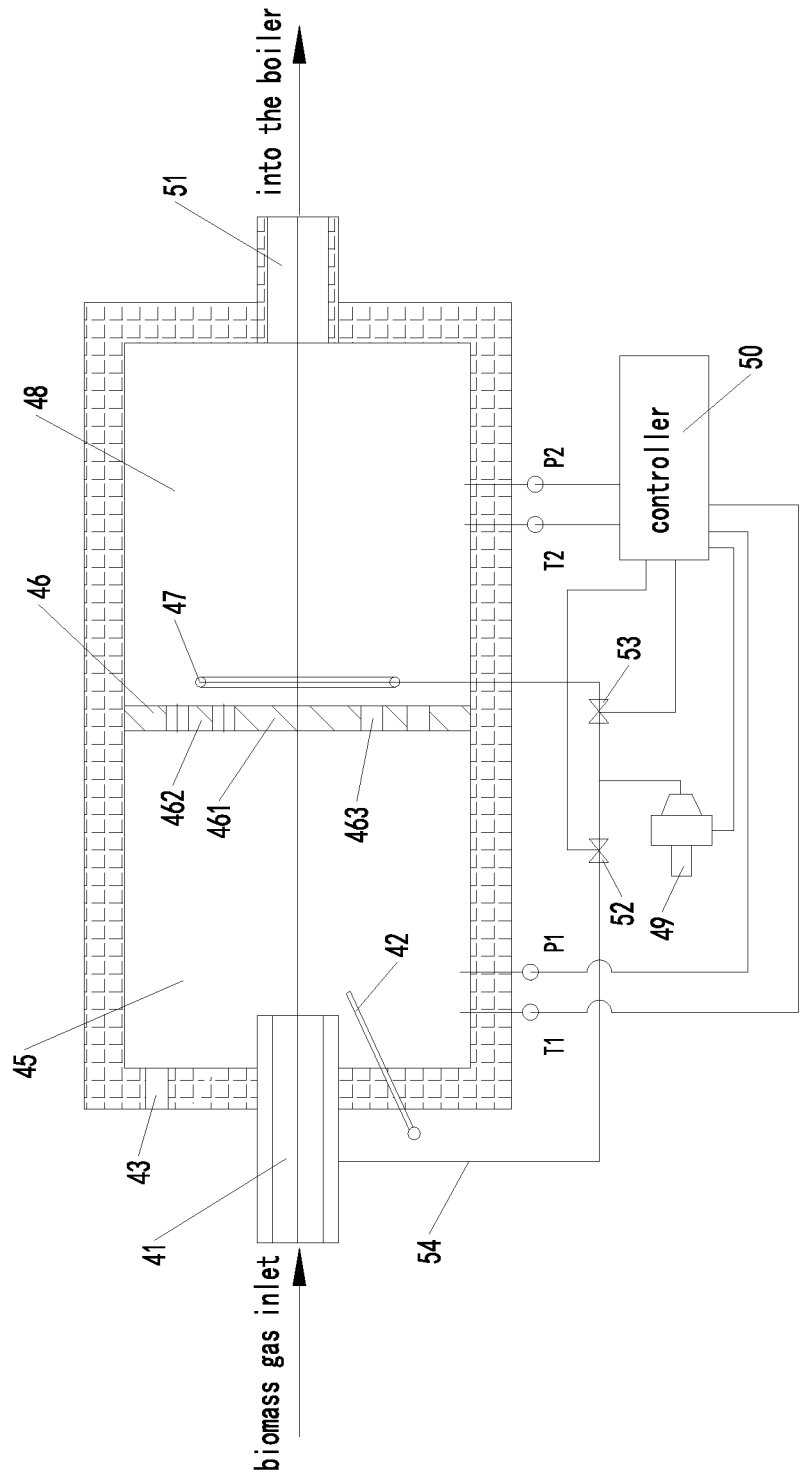
FIG. 7 is a schematic view of the structure of the stable and environmentally friendly combustion chamber for biomass gasification combustible gas.

Referring to FIG. 7, a stable and environmentally friendly combustion chamber for biomass gasification combustible gas comprising: a combustion pipe 41 is connected to a biomass gas inlet and a primary air distribution pipe 54; the combustion pipe 41 is connected to a primary chamber body 45. The first stage cavity body 45 is provided with an ignition gun 42, a fire door 43, and a thermocouple T1. The rear end of the first stage cavity body is connected to the honeycomb-shaped heat storage body 46, and the rear side of the honeycomb-shaped heat storage body 46 is connected to the second stage cavity body 48, the second stage cavity body 48 (the rear side of the honeycomb-shaped heat storage body 46) is provided with a secondary air distribution pipe 47, a thermocouple T2, the second stage cavity body 48 is connected to the outlet high-temperature flue gas pipe 51, the primary air distribution pipe 54 is connected to the air blower 49 through the primary air volume adjustment valve 52 and the secondary air distribution pipe 47 is connected to the air blower 49 through the secondary air volume adjustment valve 53, and the controller 50 is connected to the thermocouple T1, the thermocouple T2, the primary air volume adjustment valve 52, the secondary air volume adjustment valve 53, the air supply fan 49, a pressure transmitter P1, and a pressure transmitter P2, thereby formed a combustion chamber.

The function of the controller 50 is as follows:

1) Controlling the primary air volume to be about 90% of the required air volume of the combustible gas, the secondary air volume is about 10% of the required air volume of the combustible gas; and 2) The temperature of the first stage cavity body is controlled at 1000° C., the controller obtains the overheat temperature signal from the thermocouple T1, adjusting the primary air volume adjustment valve 52 and the secondary air volume adjustment valve 53 to reduce the primary air volume and simultaneously increase the secondary air volume.

Figure 8:
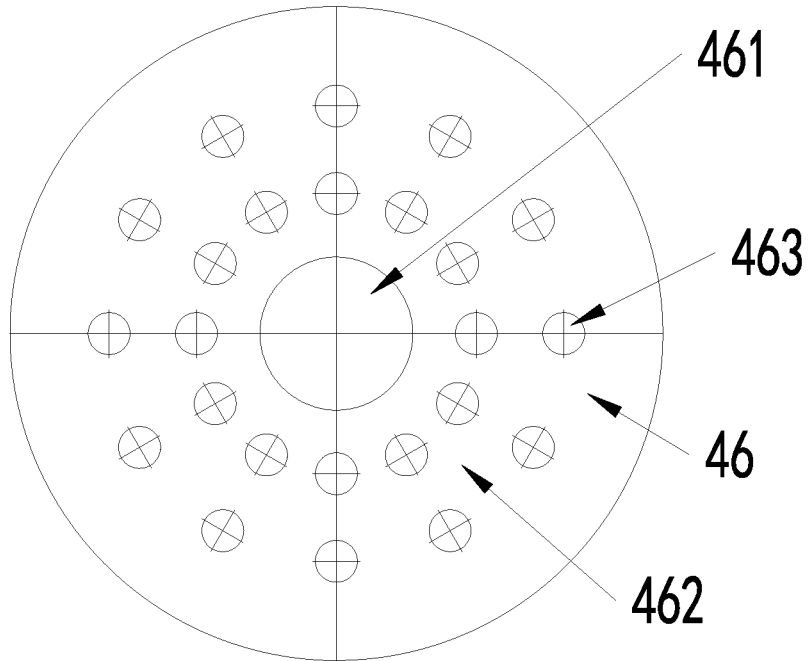
FIG. 8 is a schematic diagram of the heat storage body.
Figure 9:
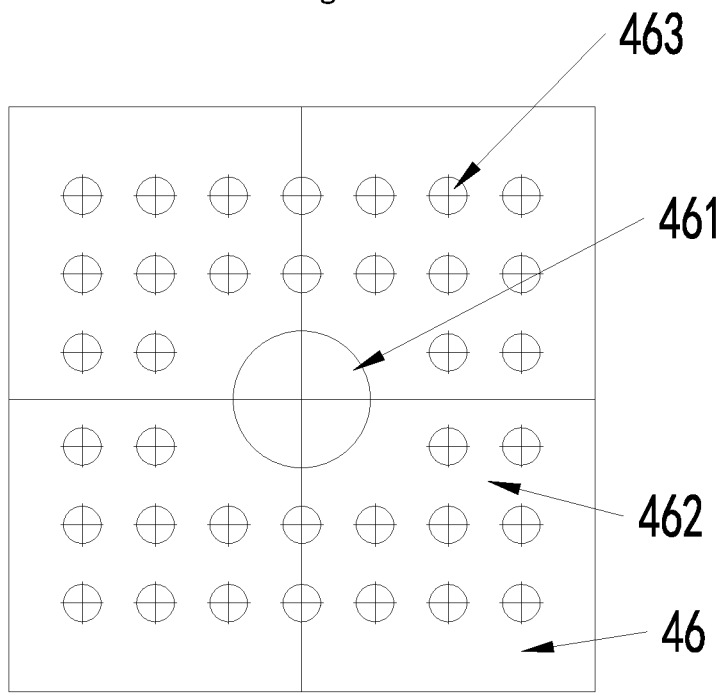
FIG. 9 is a schematic diagram of another heat storage body.

Referring to the heat storage bodies shown in FIGS. 8 and 9, the shape of the heat storage body 46 may vary depending on the shape of the cavity body, and may be a square shape or a circular shape. The distance between the front end surface of the heat storage body 46 and the end portion of the inlet combustion pipe 41 is 1.1-1.3 times of the length of the combustion flame. The flow area of the through hole of the heat storage body is 40-50% of the cross-sectional area of the honeycomb-shaped heat storage body, and the intermediate portion 461 of the heat storage body is not opened, and the cross-sectional area of the non-opening area is substantially the same as the cross-sectional area of the combustion tube, and the peripheral portion 462 of the heat storage body is an open area, and the area is provided with a through hole 463, and the sum of the flow areas (cross-sectional areas) of the through holes is 40-50% of the cross-sectional area of the open area of the peripheral portion of the heat storage body, the heat storage body material is zirconium corundum brick or magnesia chrome brick which has a heat storage capacity and a high-temperature resistance.

Figure 10:
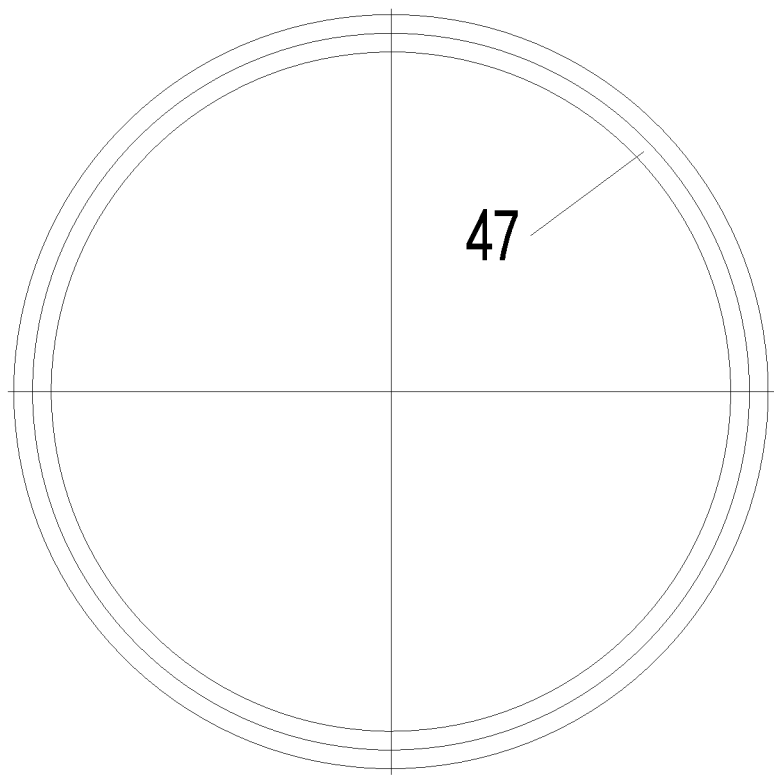
FIG. 10 is a schematic diagram of the secondary air distribution pipe.
Figure 11:
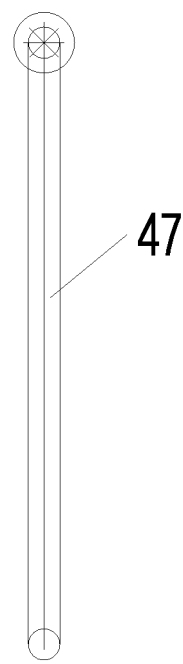
FIG. 11 is a left side view of FIG. 10.
Figure 12:
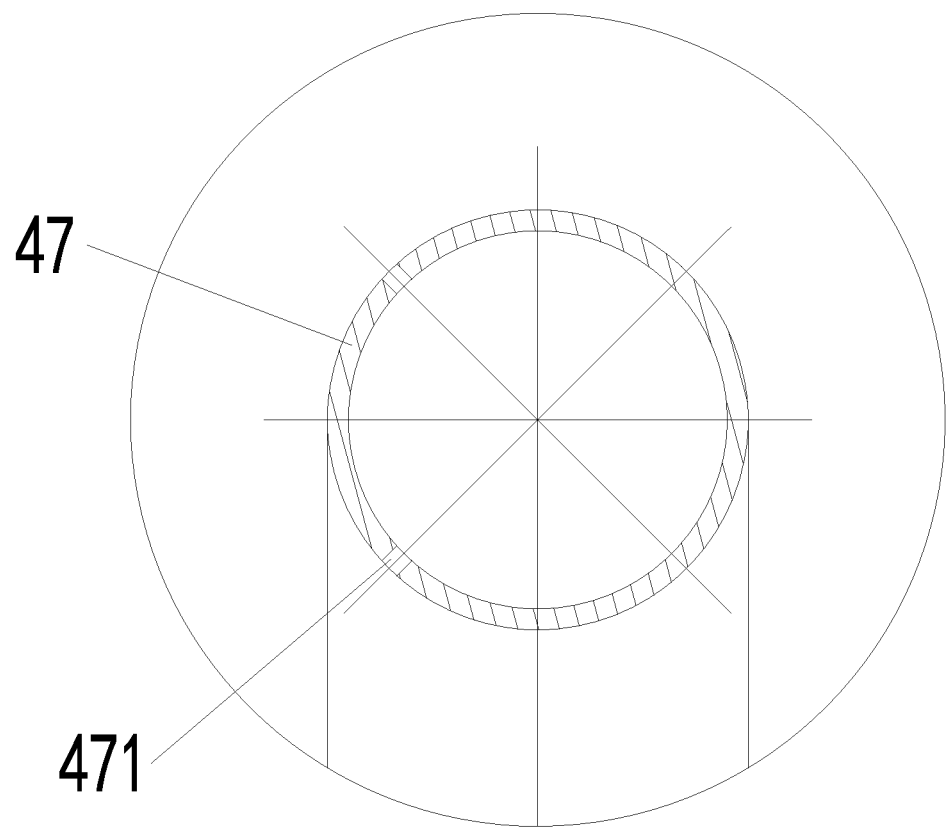
FIG. 12 is a partial enlarged view of FIG. 11.

Referring to the secondary air distribution pipe shown in FIGS. 10 and 11, the secondary air distribution pipe 47 is located at a distance of 100-200 cm from the rear end surface of the heat storage body 46, and the air distribution pipe is also vary according to the shape of the cavity body, and may be a square shape or may be designed in a circular shape, and the secondary air distribution pipe 47 has a secondary air pipe outlet 471 uniformly open toward the side of the heat accumulator 46.

The advantages of the stable and environmentally friendly combustion chambers for biomass gasification combustible gas are that:

1) The burner can adapt to the wide fluctuation of the calorific value of the combustible gas. The combustion chamber uses honeycomb-shaped heat storage body, and the heat storage body dissipates heat slowly, ensuring that the temperature thereof is always higher than the combustible gas burning point, that is, ensuring the stable combustion of the low calorific value; and 2) The combustion chamber adopts a two-stage combustion chamber and a two-stage automatic air distribution structure to control the combustion temperature and create a reducing atmosphere for combustible gas, so that achieve the purpose of controlling the nitrogen oxide amounts of the exhaust gas.

Referring to FIG. 1, taking the wood material as an example, the sliced material is passed through a biomass pretreatment device 100 (sliced to about 3-6 cm with a drum slicer), and the hoist enters the gasifier through the closed feed device 2 in the gasification apparatus 200. The fan 17 drums in hot air from air preheater 10; at the same time, the water within the heating tube sheet 4 in the lower portion of the gasifier gradually absorbs the heat in the reaction zone to form steam in the fan drum, and after passing through the second valve 15, the steam and the hot air are mixed in the mixer 13, and then the fan 17 sent them into the carbon spiral shaft of the gasifier, and then they are uniformly distributed into the gasifier through the air outlet on the screw shaft, and an oxidation-reduction reaction occurs at 700-850° C. At the same time, a hydrogenation reaction occurs due to a certain proportion of water vapor, and hot gas is generated after gasification (the hot gas temperature is 200-300° C., and contains extract, tar, dust), the calorific value is 1600-1800 kcal. The biomass coal produced in the lower portion of the gasification apparatus 200 is cooled by the spiral of water passing through the inner shaft and the outer casing of the conventional equipment, and is packaged and stored in the warehouse after collection, according to the different biomass materials, it can be used for making barbecue carbon, carbon-based fertilizer, activated carbon and the like.

A bridge breaking device is arranged at the bottom of the gasifier to prevent the reaction zone from bridging; a unique spiral discharge air distribution device is provided to ensure uniform discharge air distribution; the steam generating air intake system using the heat of the reaction zone and the external mix air intake method using steam and hot air ensure the reaction is stable, and the mixed gasification increases the calorific value of the combustible gas to 1600-1800 kcal, meeting the requirements of high-temperature high-pressure boiler.

The hot gas containing the extract, tar, and dust is sent into the environmental combustion chamber 300 for combustion under the positive pressure of the fan 27. The controller 50 controls the primary air volume sent into the first stage cavity body 45 to be 90% of the total air volume, and the secondary air volume sent into the second stage cavity body 48 is 10% of the total air volume. It forms an oxygen-limited combustion environment in the first stage cavity body, while the fuel-type nitrogen oxides is produced under an oxidizing atmosphere, and the amount of the combustion-type nitrogen oxide amounts produced by the first stage cavity body is greatly reduced. There is also 10% of the combustible gas that is not burned; the oxygen is supplied through the second stage cavity body for combustion. The temperature of the first stage cavity body is controlled to be below 1000° C. by controlling the air supply volume of the first stage cavity body. If the temperature is exceeded, the controller will automatically reduce the amount of the air volume, thus reduces the generation of thermal nitrogen oxides. The heat storage body 46 keeps the temperature under the burning of the combustible gas combustion flame. When the combustible gas has large fluctuations, for example, the calorific value of the combustible gas suddenly drops to 650 Kcal, at this time, the flame may be instantaneously broken due to the air distribution, when the combustible gas is directly sprayed onto the high-temperature heat storage body and re-ignites immediately (even if it can't be burned immediately, the low-calorific value combustible gas will be oxidized immediately). At the same time, the controller automatically adjusts the supply air volume to ensure oxygen supply, thus ensuring that the combustible gas does not fluctuate due to the calorific value. The non-combustible gas will not accumulate in the subsequent boiler to cause a safety accident, and also ensuring the stable operation of the combustion chamber. The combustion chamber of the present invention can realize the stable combustion of the biomass gasification hot gas with the fluctuation of the calorific value, and reduce the nitrogen oxide amounts, thereby ensuring the environmental protection of the combustion.

The high-temperature flue gas combusted by the combustion chamber 300 is through the outlet high-temperature flue gas pipe 51 directly sent into the boiler 400. The boiler 400 generates high-temperature high-pressure steam to drive the steam turbine 900, thereby driving the generator 1000 to generate electricity, and the steam passed through the steam turbine and is partially for heating, and the low-temperature water enters the condenser and returns to the coal economizer 500 for boiler hydration. The exhaust gas of the boiler 400 is first passed through the coal economizer 500, and then the gasifying agent is preheated by the air preheater 600. After the preheating, the air is sent into the combustion chamber 300 and the gasifier 200, and the exhaust gas is finally discharged through the exhaust 800.

The present invention adopts the gasification apparatus for preparing a medium calorific value biomass combustible gas to generate a calorific value of 1600-1800 kcal, and the combustion can meet the heat generation requirement of the high-temperature high-pressure boiler, and the power generation efficiency can be improved; by adopting an environmentally friendly combustion chamber, while the combustion is stable, the nitrogen oxide content of the exhaust gas can be reduced, and the exhaust gas can meet the discharge requirement without adding a denitration device; the product is diverse, the economic benefit is good, and can be used on a large scale.

What is claimed is:

1. An apparatus for generating electricity and producing carbon and heat via biomass fixed bed gasification, comprising:
   a gasification apparatus (200) for preparing a medium calorific value biomass combustible gas, a stable and environmentally friendly combustion chamber (300) for stable combustion of biomass gasification combustible gas, a high-temperature high-pressure boiler (400), an air preheater (600), a flue gas exhaust fan (700), and a steam turbine (900);
   a combustible gas outlet disposed within said gasification apparatus (200) is fluidically connected with a combustion pipe of said environmentally friendly combustion chamber (300), and a high-temperature outlet flue gas pipe disposed within said environmentally friendly combustion chamber (300) is fluidically connected to a gas inlet of said high-temperature high-pressure boiler (400);
   a steam outlet of said high-temperature high-pressure boiler (400) is fluidically connected to a steam inlet of said steam turbine (900);
   an exhaust pipe of said high-temperature high-pressure boiler (400) is fluidically connected to a shell path of said air preheater (600), an air preheating pipe passes through a pipe path of said air preheater (600) and is respectively disposed in fluidic communication with said combustion pipe of said environmentally friendly combustion chamber (300) of said gasification apparatus (200);
   a low temperature water outlet of said steam turbine (900) passes through a coal economizer (500) and is in fluidic communication with a filling port of said high-temperature high-pressure boiler (400), and an exhaust pipe of said high-temperature high-pressure boiler (400) is, in turn, fluidically connected with said coal economizer (500) and said air preheater (600);
   said gasification apparatus (200) further comprises a gasifier and a steam generating air intake system;
   a closed feed device (2) is disposed within an upper portion of said gasifier, a spiral discharge air distribution device (5) is disposed within a bottom portion of said gasifier, and a screw shaft (29), rotatable within said spiral discharge air distribution device (5), comprises a hollow shaft, having a spiral blade disposed upon its outer circumference, and an air outlet for establishing fluidic communication between an interior portion of said hollow shaft with an internal portion of said gasifier which is uniformly disposed upon said hollow shaft;
   a steam generating air intake system comprises a skirt drum (11), a circulating heat pump (12), and a heating tube sheet (4) disposed upon said gasifier, a mixer (13), a fan (17) and a valve;
   an outlet of said heating tube sheet (4) is connected to a water intake of a steam drum (9) via a circulating heat pump (12);
   a steam outlet (7) of said steam drum (9) is fluidically connected to an inlet of said mixer (13) via a valve (15);
   an outlet of said fan (17) is fluidically connected to an inlet of said mixer (13) via a valve (14);
   an outlet of said mixer (13) is fluidically connected to an end of said screw shaft (29) through a rotary joint (30); and
   an inlet of said fan (17) is fluidically connected to an air outlet of said air preheater (600).

2. The apparatus as set forth in claim 1, wherein:
said spiral discharge air distribution device (5) comprises a plurality of parallel trapezoidal carbon troughs (28) passing through said bottom of said gasifier, wherein each one of said trapezoidal carbon troughs (28) is provided with a rotating screw shaft (29);
one end of each one of said trapezoidal carbon troughs (28) extends outside of said gasifier and is connected to a carbon warehouse (26); and
a rotating secondary carbon spiral (27) is disposed within said carbon warehouse (26).

3. The apparatus as set forth in claim 1, wherein:
said environmentally friendly combustion chamber (300) is divided into a first stage cavity body (45) and a second stage cavity body (48) through a honeycomb-shaped heat storage body (46); and
a combustion pipe (41) is connected to a biomass gas inlet and a primary air distribution pipe (54), said combustion pipe (41) is connected to said first stage cavity body (45), and an ignition gun (42) and a thermocouple T1 are disposed upon said first stage cavity body (45), a secondary air distribution pipe (47), opposite to said honeycomb-shaped heat storage body (46), and a thermocouple T2 are disposed within second stage cavity body (48), and said second stage cavity body (48) is connected to an outlet high-temperature flue gas pipe (51), a primary air distribution pipe (54) is connected to an air blower (49) through a primary air volume adjustment valve (52), a secondary air distribution pipe (47) is connected to said air blower (49) through a secondary air volume adjustment valve (53), a controller (50) is connected to said thermocouple T1, said thermocouple T2, said primary air volume adjustment valve (52), said secondary air volume adjustment valve (53), and said air blower (49), and an inlet of said air blower (49) is connected to said air outlet of said air preheater (600).

4. The apparatus as set forth in claim 3, wherein:
said honeycomb-shaped heat storage body (46) is spaced a distance from an end of said inlet combustion pipe (41) that is 1.1-1.3 times a length dimension of a combustion flame;
said heat storage body (46) is coaxial with said combustion pipe (41);
a middle portion of said heat storage body (46) has a non-open area that is as large as a cross-sectional area of said combustion pipe (41);
a peripheral portion of said heat storage body (46) is opened via a through hole;
flow areas of said through hole is 40-50% of a cross-sectional area of said peripheral portion of said heat storage body (46); and
said heat storage body (46) is fabricated from the group comprising zirconium corundum brick and magnesia chrome brick.

5. The apparatus as set forth in claim 3, wherein:
a primary air volume entering said combustion pipe (41) through said primary air distribution pipe (54) is about 90% of a required air volume of said combustible gas;
a secondary air volume entering said second stage cavity body (48) through said secondary air distribution pipe is 10% of said required air volume of said combustible gas; and
a temperature of said first stage cavity body (45) is below 1000° C.

* * * * *